United States Patent [19]

Kishida et al.

[11] Patent Number: 5,296,546
[45] Date of Patent: Mar. 22, 1994

[54] WEATHER RESISTANT IMPACT MODIFIERS FOR THERMOPLASTIC RESINS

[75] Inventors: Kazuo Kishida, Hiroshima, Japan; Kiyokazu Kitai, Westfield, N.J.

[73] Assignee: Mitsubishi Rayon Co., Ltd.

[21] Appl. No.: 952,467

[22] Filed: Sep. 28, 1992

Related U.S. Application Data

[63] Continuation of Ser. No. 369,685, Jun. 21, 1989, abandoned.

[30] Foreign Application Priority Data

Aug. 10, 1988 [JP] Japan .................. 63-198082

[51] Int. Cl.$^5$ .................. C08F 265/04; C08F 265/06; C08F 297/02
[52] U.S. Cl. ..................... 525/310; 525/281; 525/304; 525/315; 525/316; 525/67; 525/80
[58] Field of Search ............... 525/281, 304, 310, 315, 525/316

[56] References Cited

U.S. PATENT DOCUMENTS

| | | | |
|---|---|---|---|
| 3,842,144 | 10/1974 | Tanaka et al. | 525/310 |
| 3,886,232 | 5/1975 | Tanaka et al. | 525/310 |
| 3,944,630 | 3/1976 | Ide | 525/310 |
| 3,959,408 | 5/1976 | Yusa et al. | 525/310 |
| 4,078,018 | 3/1978 | Chauvel et al. | 525/310 |
| 4,108,946 | 8/1978 | Kamada et al. | 525/310 |
| 4,128,605 | 12/1978 | Kishida et al. | |
| 4,362,845 | 12/1982 | Kamata | 525/310 |
| 4,376,843 | 3/1983 | Lindner et al. | |
| 4,443,585 | 4/1984 | Goldman | 525/310 |
| 4,513,111 | 4/1985 | Kishida et al. | 525/310 |
| 4,690,977 | 9/1987 | Hosoi et al. | 525/310 |

FOREIGN PATENT DOCUMENTS

| | | |
|---|---|---|
| 1188442 | 6/1985 | Canada . |
| 0042091 | 12/1981 | European Pat. Off. . |
| 0186047 | 7/1986 | European Pat. Off. . |
| 0248255 | 12/1987 | European Pat. Off. . |
| 47863 | 12/1972 | Japan . |
| 21035 | 6/1977 | Japan . |
| 57-149348 | 9/1982 | Japan . |
| 1039802 | 8/1966 | United Kingdom . |

OTHER PUBLICATIONS

Translation of European 0186047.

Primary Examiner—Vasu S. Jagannathan
Attorney, Agent, or Firm—Cushman, Darby & Cushman

[57] ABSTRACT

A weather resistant impact modifier for thermoplastic resins and a blend with the thermoplastic resin are disclosed. The modifier comprises a graft copolymer having a multi-layered structure which is obtained by graft polymerization of (c) 10–100 parts by weight of an aromatic vinyl compound or a monomer mixture mainly composed of an aromatic vinyl compound in a first stage and 10–100 parts by weight of a methacrylic ester or a monomer mixture mainly composed of a methacrylic ester in a second stage, (b) to 100 parts by weight of an elastomer obtained by polymerizing 98–60 parts by weight of a monomer mixture composed of 50–99.95% by weight of an acrylic ester, 0–50 wt % of a copolymerizable monomer and 0.05–5% by weight of a polyfunctional monomer, (a) in the presence of 2–40 parts by weight of a butadiene elastomer having a degree of swelling of 5–40 and an average particle size of not smaller than 0.15 $\mu$m (wherein the total of (a) and (b) is 100 parts by weight).

10 Claims, No Drawings ns which can impart
WEATHER RESISTANT IMPACT MODIFIERS FOR THERMOPLASTIC RESINS This is a continuation of application Ser. No. 07/369,685, filed on Jun. 21, 1989, which was abandoned upon the filing thereof.

BACKGROUND OF THE INVENTION

1. Field of the Invention

This invention relates to weather resistant impact modifiers for thermoplastic resins which can impart high impact resistance and good processability to the resins, and thermoplastic composition comprising a thermoplastic resin and the modifier.

2. Description of the Prior Art

Thermoplastic resins, particularly vinyl chloride resins (hereinafter abbreviated as "PVC") have been widely employed as general-purpose resins but their mechanical properties are not necessarily satisfactory. More specifically, PVC is poor in impact strength, particularly in notched impact strength. In order to improve the impact strength, there have been proposed a variety of modifiers.

Among these proposals, there are known some effective methods including a method wherein so-called a MBS resin obtained by graft polymerization of an alkyl methacrylate and an aromatic vinyl compound to a conjugated diene elastomers is blended with PVC, and a method wherein an ABS resin obtained by graft polymerization of a vinyl cyanide and an aromatic vinyl compound to a conjugated diene elastomer is blended with PVC. However, since the MBS resin and ABS resin contain large amounts of double bonds in the main chain of the elastomer components, they will cause a choking phenomenon and lowering of impact strength when used over a long term in outdoor environment. Thus, these resins are not suited for outdoor applications.

A number of resin compositions having excellent weather resistance have also been proposed wherein a copolymer obtained by graft polymerization of an alkyl methacrylate, an aromatic vinyl compound and a vinyl cyanide to a saturated polyalkyl acrylate elastomer is blended with PVC. Although these compositions exhibit good impact strength at ambient temperatures, the impact strength at low temperatures is not always satisfactory because of the relatively high Tg value of the polyalkyl acrylate.

Moreover, U.S. Pat. No. 4,393,172 has proposed a graft copolymer using a diene rubber as a part of a core component, but the effect on improvement in the impact strength is not satisfactory.

When blended with thermoplastic resins, conventional modifiers for thermoplastic resins have disadvantages that the weather resistance of the resins is worsened and that an effect of the modifiers on imparting impact strength to the resins is not satisfactory. Thus, modifiers capable of imparting excellent impact strength, weather resistance and processability to the resins have not been obtained yet.

As the results of intensive studies for obtaining a modifier, which has excellent weather resistance and deep effect on imparting impact resistance to the resins not only at ambient temperatures but also at low temperatures, it has been found that a graft copolymer, which is obtained by graft polymerization by two stages of monomers having specific compositions to an elastomer which has a two-layered structure and is obtained by polymerizing an acrylic ester or a monomer mixture mainly composed of the acrylic ester in the presence of a butadiene rubber having specified properties, is useful as a modifier having intended modification effects.

SUMMARY OF THE INVENTION

The present invention is to provide a weather resistant impact modifier for thermoplastic resins which comprises a graft copolymer having a multi-layered structure which is obtained by graft polymerization of (c) 10–100 parts by weight of an aromatic vinyl compound or a monomer mixture mainly composed of an aromatic vinyl compound in a first stage and 10–100 parts by weight of a methacrylic ester or a monomer mixture mainly composed of a methacrylic ester in a second stage, (b) to 100 parts by weight of an elastomer obtained by polymerizing 98–60 parts by weight of a monomer mixture composed of 50–99.95% by weight of an acrylic ester, 0–50% by weight of a copolymerizable monomer and 0.05–5% by weight of a polyfunctional monomer, (a) in the presence of 2–40 parts by weight of a butadiene elastomer having a degree of swelling of 5–40 and an average particle size of not smaller than 0.15 μm [wherein the total of (a) and (b) is 100 parts by weight].

Another object of the present invention is to provide a blend of a thermoplastic resin and the modifier.

DESCRIPTION OF THE PREFERRED EMBODIMENTS

The butadiene elastomer which constitutes the innermost layer of the modifier with a multi-layered structure according to the invention should have a degree of swelling of 5–40 and an average particle size of not smaller than 0.15 μm. When the degree of swelling is less than 5, the effect on the improvement of the impact resistance is not significant. Over 40, the appearance of a molded article obtained from a blend of the thermoplastic resin and the modifier becomes worsened. The degree of swelling is defined according to the following equation.

$$\text{Degree of swelling} = W_1/W_2$$

wherein $W_1$ = a weight of a swollen sample which is determined by completely drying a rubber latex sample and then immersing a given amount of the dried sample in 200 times the amount of toluene at 30° C. for 48 hours, and $W_2$ = a weight of the sample in an oven dried condition.

The degree of swelling is controllable depending upon the polymerization temperature and the amount of catalyst. In addition, it may be controlled by addition of controlled amounts of a chain transfer agent and a crosslinking agent. The particle size of the butadiene elastomer is one of important factors. When the particle size is below 0.15 μm, a satisfactory improving effect on the impact resistance cannot be obtained.

The butadiene elastomer is preferably prepared by emulsion polymerization. An intended particle size can be attained by properly controlling the type and amount of emulsifier and catalyst and the polymerization temperature conditions following conventional technique. Alternatively, it is possible that a polymer having a small size is first prepared and is agglomerated into larger particles to give a desired particle size. The agglomeration into larger particles is preferably made by a method wherein an electrolyte and/or an acid and/or a polymer latex containing carboxyl groups is added. Examples of the electrolyte include inorganic electrolytes such as sodium chloride, Glauber's salt, potassium chloride, magnesium chloride, magnesium sulfate, calcium chloride and the like, and polymer electrolytes such as polyacrylamide, polyacrylic acid, polyvinyl alcohol, polyvinylpyrrolidone and the like. Examples of the acid include inorganic acids such as hydrochloric acid, nitric acid, sulfuric acid and the like, and organic acids such as acetic acid, citric acid, succinic acid, itaconic acid and the like. The polymer latices containing carboxyl groups include latices which are obtained by emulsion copolymerization of monomer mixtures such as those of n-butyl acrylate and methacrylic acid, ethyl acrylate and methacrylic acid, n-butyl acrylate and acrylic acid, and the like.

The butadiene elastomers are polybutadiene or butadiene copolymers derived from 50% by weight or more of butadiene and 50% by weight or below of monomers copolymerizable therewith. In view of the effect on imparting a low temperature impact resistance, polybutadiene is preferred.

The component (b) consists of 50-99.95% by weight of an acrylic ester, 0-50% by weight of a copolymerizable monomer and 0.05-5% by weight of a polyfunctional monomer.

Examples of the acrylic ester are preferably alkyl acrylates whose alkyl moiety has 2-10 carbon atoms and include, for example, ethyl acrylate, propyl acrylate, n-butyl acrylate, isopropyl acrylate, hexyl acrylate, octyl acrylate, 2-ethyl-hexyl acrylate and the like.

The copolymerizable monomer which is an optional ingredient includes, for example, methyl methacrylate and other methacrylates, styrene and other aromatic vinyl compounds, vinyl cyanides and the like. In order to improve the impact resistance, particularly, a low temperature impact resistance, the copolymerizable monomers should not preferably be used.

The polyfunctional monomer is an essential ingredient in the component (b) and its amount ranges 0.05-5% by weight. With amounts less than 0.05% by weight, satisfactory crosslinkage of the elastomer with grafted portions cannot be obtained. When the amount is more than 5% by weight, the elastomer are deteriorated. Both cases worsen the effect on imparting the impact resistance. The polyfunctional crosslinking agents include divinylbenzene, diacrylic esters or dimethacrylic esters which are esters of acrylic acid or methacrylic acid and polyhydric alcohols, triallyl cyanurate, trially isocyanurate, allyl acrylate, allyl methacrylate, diallyl itaconate, dially phthalate and the like. In view of the graft polymerization, crosslinking agents having the allyl group are preferred.

In order to impart a good impact resistance to the thermoplastic resins, the polymer composed mainly of the acrylic ester for use as the component (b) should preferably have a molecular weight of not less than 500,000 when polymerized without use of the polyfunctional crosslinking agent.

As described above, the elastomer used in the present invention has a two-layered structure composed of the component (a) and the component (b). When the total amount of (a) and (b) is taken as 100 parts by weight, the elastomer is composed of 2-40 parts by weight of the component (a) and 98-60% by weight of the component (b). If the amount of the component (a) is less than 2 parts by weight, the effect on the improvement of the impact resistance at low temperatures is not high. When the amount is more than 40 parts by weight, the weather resistance, the resistance to thermal discoloration and the capability of keeping physical properties after exposure to heat lower.

The component (c) is polymerized to the elastomers comprised of both components (a) and (b). 10-100 parts by weight of a monomer or monomer mixture composed mainly of an aromatic vinyl compound is polymerized in a first stage and 10-100 parts by weight of a monomer or monomer mixture composed mainly of a methacrylic ester is polymerized in a second stage. Examples of the aromatic vinyl compound include styrene, $\alpha$-methylstyrene, vinyltoluene and the like. The methacrylic esters include methyl methacrylate, ethyl methacrylate, propyl methacrylate and the like. If the graft polymerizations are effected in a reverse order or if the two-stage polymerization is effected in one stage or if the amounts of the monomers are outside the above ranges, the effect on imparting the impact resistance becomes small.

The emulsifiers may be anionic surface active agents such as fatty acid salts, alkylsulfate, alkylbenzenesulfonate, alkyl phosphate, dialkylsulfosuccinate and the like, nonionic surface active agents such as polyoxyethylene alkyl ethers, polyoxyethylene fatty acid esters, sorbitan fatty acid esters, glycerine fatty acid esters and the like, and cationic surface active agents such as alkylamine salts. These surface active agents may be used singly or in combination.

When the pH of the polymerization system is rendered alkaline depending upon the type of emulsifier, an appropriate pH regulator may be used in order to prevent hydrolysis of the alkyl acrylate.

As the polymerization initiators, conventional inorganic initiators such as persulfates, organic peroxides or azo compounds may be used singly. Alternatively, the above-mentioned initiators may be used in combination with sulfites, hydrogensulfites, thiosulfates, metal(I) salts, sodium formaldehyde sulfoxylates and the like, thereby forming redox initiators. Preferable persulfates used as the initiator include sodium persulfate, potassium persulfate, ammonium persulfate and the like, and preferable organic peroxides include t-butyl hydroperoxide, cumene hydroperoxide, benzoyl peroxide, lauroyl peroxide and the like.

The chain transfer agent may be used so as to regulate a molecular weight of the resultant polymer. The chain transfer agent may be an alkyl mercaptan having 5-20 carbon atoms.

The polymerization is carried out at a temperature, at which the initiator starts to decompose, under ordinary emulsion polymerization conditions. For the polymerization in the respective stages, all of the monomers or monomermixtures may be added at one time, or all or part thereof may be added continuously.

The resultant latex of a multi-layered grafted copolymer is usually coagulated by salting-out or by addition of an acid and the copolymer may be collected in the form of powder by filtration and washing with water. Alternatively, the copolymer may be collected in the form of powder after spray-drying or freeze-drying.

The weather resistant and impact modifier according to the invention is a copolymer having such a multi-layered structure as described before and can impart high impact resistance and good processability to various thermoplastic resins and can also impart good weather resistance to final molded articles.

The amount of the weather resistant impact modifier of the invention to be blended with thermoplastic resins is preferably 3-50 parts by weight per 100 parts by weight of a thermoplastic resins. If the amount is less than 3 parts by weight, the impact-improving effect is not significant. Over 50 parts by weight, the mechanical properties inherent to thermoplastic resins become worse.

The thermoplastic resins include, for example, PVC, polycarbonate, polyester, acrylonitrile-styrene copolymers, other styrene resins, methyl methacrylate-styrene copolymers and other methacrylic resins, and the like. PVC may be, aside from polyvinyl chloride, vinyl chloride copolymers having 70% by weight or more of vinyl chloride. The monomers copolymerizable with vinyl chloride include ethylene, propylene, vinyl bromide, vinylidene chloride, vinyl acetate, acrylates, methacrylates and the like.

The mixing of the weather resistant impact modifier of the invention and thermoplastic resins is effected in the form of powders by the use of as known kneader such as a ribbon blender, the Henschel mixer or the like. The mixture is processed, for example, by a mixing roll, a Banbury mixer, an extruder or an injection molding machine. For formulation, any known stabilizers, plasticizers, lubricants, colorants, flame retarders and the like may be added, if necessary.

[EXAMPLES]

The present invention will be described in further detail with reference to Examples and Comparative Examples. However it should be understood that the present invention is by no means restricted by such specific Examples. In examples, "parts" and "%", respectively, mean "parts by weight" and "wt %".

EXAMPLE 1

(1) Preparation of butadiene elastomer (A-1) latex

A mixture of 100 parts of 1,3-butadiene, 4 parts of sodium laurate, 0.5 parts of n-lauryl mercaptan, 0.4 parts of potassium persulfate and 180 parts of deionized water was charged into an autoclave which was purgedn with nitrogen, followed by polymerization at 60° C. for 50 hours under agitation to obtain a rubber latex (average particle size of 0.09 m). The degree of swelling was 25.

(2) Synthesis of polymer latex (B) for agglomerating latex (A) into large particle size latex

| | |
|---|---|
| Ethyl acrylate | 80 parts |
| Methacrylic acid | 20 parts |
| Potassium persulfate | 0.5 parts |
| Nonsoul TK-1 | 2.0 parts |
| (semi-hardened potassium soap, available from Nippon Oils & Fats Co., Ltd.) | |
| Rapisol 80 | 1.0 part |
| (sodium octylsulfosuccinate, available from Nippon Oils & Fats Co., Ltd.) | |

-continued

| | |
|---|---|
| Water | 200 |

The above composition was subjected to polymerization at 70° C. for 4 hours to obtain an emulsion latex having a pH of 6.2.

(3) Synthesis of larger-sized latex 100 parts (solid content) of (A-1) latex was charged into a reactor equipped with an agitator, to which 2.0 parts (solid content) of (B) latex was added in 10 seconds under agitation to obtain larger-sized latex (A-2). The larger-sized latex thus formed had an average particle size of 0.5 μm.

(4) Preparation of graft copolymer

To 10 parts (as a solid content) of the larger-sized latex were added 2 parts of Nonsoul TK-1 dissolved in 150 parts of deionized water and a mixture of 89.5 parts of butyl acrylate and 0.5 parts of triallyl cyanurate, followed by heating to 50° C. and further addition of 0.2 parts of potassium persulfate (10 parts of water) to cause polymerization for 2 hours.

Then, 0.6 parts (10 parts of water) of Nonsoul TK-1 was added to the elastomer obtained, and the mixture was heated to 80° C., followed by dropping 30 parts of styrene in 1 hour while keeping the temperature and maintaining the system for 2 hours.

30 parts of methyl methacrylate was further dropped in 1 hour, followed by maintaining for 2 hours to complete the polymerization.

The polymerization rates of the butyl acrylate, styrene and methyl methacrylate after the maintenance for the given times were all 99% or over. To the latex was added 0.5 parts of B.H.T. (2,6-di-tertiary butyl-p-cresol) as a heat stabilizer in an emulsified state, which was added to an aqueous sulfuric acid solution for coagulation with the acid, followed by washing, dehydration and drying to obtain a powder of the graft copolymer (Example 1-a).

Further, modifiers which were prepared by repeating the procedures of (2), (3) and (4) set forth above except that the amounts of the mercaptan and the crosslinking agent, and a degree of swelling of the rubbers in the preparation (1) of butadiene latex were changed to prepare graft copolymers of Examples 1-(b) and 1-(c) and Comparative Examples 1 and 2. These are shown in Table 1 along with the modifier of Example 1-(a).

(5) Preparation of blend composition with PVC 100 parts of a mixture of 10 parts of the multi-layered grafted copolymer and 90 parts of a PVC having an average degree of polymerization of 700 was mixed with 2.5 parts of dibutyl tin maleate, 0.8 parts of butyl stearate and 0.7 parts of a lubricant, followed by heating to 115° C. by means of a Henschel mixer to obtain a uniform mixture. This PVC composition was kneaded in a mixing roll regulated at 175° C. for 3 minutes and formed into a sheet, after which the resultant sheets were hot pressed to obtain test pieces, followed by measurement of impact strength. The impact strength was determined by a V-notched Izod impact test according to ASTM-D-256. The appearance was visually observed. These results are shown in Table 1.

TABLE 1

|  | Amount of n-lauryl mercaptan on polymerization of butadiene (phG) | Amount* of 1,3-BD cross-link-ing agent on polymerization of butadiene (phG) | Degree of swelling | Izod impact strength (kg · cm/cm$^2$) | Appearance |
| --- | --- | --- | --- | --- | --- |
| Ex. 1-(a) | 0.5 | 0 | 25 | 95.6 | good |
| Ex. 1-(b) | 0.2 | 0 | 18 | 92.1 | good |
| Ex. 1-(c) | 0 | 0 | 9 | 88.2 | good |
| Comp. Ex. 1 | 0 | 3.0 | 4 | 15.6 | good |
| Comp. Ex. 2 | 1.0 | 0 | 45 | 72.4 | poor |

*1,3-BD: 1,3-butyleneglycol dimethacrylate

From Table 1, it will be seen that when butadiene rubber having a degree of swelling less than 5 is used, the impact resistance-improving effect becomes poorer. Over 40, the appearance becomes poor.

EXAMPLE 2

In the same manner as in Examples 1-(1), (2), a polybutadiene latex and a polymer latex for agglomeration into larger sizes were obtained. In the same manner as in Example 1-(3) except that the amount of the polymer latex for agglomeration into larger sizes was changed, there were obtained polybutadiene latices having different larger sizes. The latices were subjected to the procedures of Examples 1-(4), (5) to evaluate physical properties with the results shown in Table 2.

TABLE 2

|  | Polybutadiene latex (solid content) (parts) | Polymer latex for agglomeration (solid content) (parts) | Particle size after agglomeration (μm) | Izod impact strength (kg · cm/cm$^2$) |
| --- | --- | --- | --- | --- |
| Example 2-(a) | 100 | 0.5 | 0.20 | 75.5 |
| Example 2-(b) | 100 | 3 | 0.85 | 103.2 |
| Comp. Ex. 3 | 100 | 0 | 0.09 | 13.5 |
| Comp. Ex. 4 | 100 | 0.1 | 0.11 | 14.9 |

From Table 2, it will be seen that the impact resistance-improving effect is low unless the particle size of the polybutadiene is not smaller than 0.15 μm.

EXAMPLE 3

In the same manner as in Examples 1-(1) to (3), a polybutadiene latex having an average particle size of 0.5 μm was obtained. The general procedure of Example 1-(4) was repeated except that the amounts of components (a) and (b) were changed when a mixture of butyl acrylate and triallyl cyanurate used as the component (b) was polymerized in the presence of the polybutadiene latex, thereby obtaining a graft copolymers. 20 parts of the copolymer was mixed with 20 parts of a polycarbonate resin and 60 parts of a polybutylene terephthalate resin, followed by melt kneading at 250° C. by the use of an extruder with a 25 mm vent and pelletization. The pellets thus prepared were dried in vacuum and injection molded at a resin temperature of 250° C.

The resultant moldings were subjected to measurement of yellowness with respect to resistances to thermal coloration and thermal deterioration and Izod impact strength. Moreover, the moldings were subjected to measurement of impact strength and yellowness after accelerated exposure for 2000 hours using a sunshine weather meter. The yellowness was determined according to ASTM D-1925 using a color computer (SM-4-2, made by Suga Tester Co., Ltd.) The results are shown in Table 3.

TABLE 3

|  | Amount of polybutadiene (a) component (Parts) | Amount of (b) component (Parts) | Initial characteristics | | After heating in Gear Oven at 200° C. for 3 hours | | After exposure in sunshine weather Meter for 2000 hours | |
| --- | --- | --- | --- | --- | --- | --- | --- | --- |
|  |  |  | Izod impact strength 23° C. (kg · cm/cm$^2$) | Izod impact strength −30° C. (kg · cm/cm$^2$) | Izod impact strength 23° C. (kg · cm/cm$^2$) | YI value | Izod impact strength 23° C. (kg · cm/cm$^2$) | YI value |
| Example 3-(a) | 10 | 90 | 63.5 | 15.0 | 55.2 | 14 | 48.5 | 12 |
| Example 3-(b) | 25 | 75 | 65.6 | 17.8 | 49.0 | 16 | 45.4 | 15 |
| Comparative Example 5 | 1 | 99 | 61.9 | 7.1 | 54.3 | 11 | 47.3 | 10 |
| Comparative Example 6 | 50 | 50 | 68.1 | 20.5 | 12.3 | 66 | 22.7 | 58 |

As will be apparent from the above, when (a) component is less than 2 parts, the impact resistance at low temperatures becomes deficient. On the other hand, when the amount exceeds 40 parts, the impact strength and the resistance to discoloration after the heat exposure and after the exposure with the sunshine weather meter became worsened.

EXAMPLE 4

In the same manner as in Examples 1-(1), (2) and (3), a polybutadiene latex was obtained, followed by polymerization of the component (b) in the same manner as in Example 1-(4). Further, in the same manner as in Example 1-(4), the component (c) was polymerized except that the monomer composed (c) was polymerized except that the monomer composed mainly of the aromatic vinyl compound and the monomer composed mainly of the methacrylic ester were used at different ratios and that the order of the polymerization of the monomers was changed, thereby obtaining graft copolymers. These polymers were subjected to measurement of physical property in the same manner as in Example 1-(5) with the results shown in Table 4.

TABLE 4

| | Ratio of (c) Component | | Izod impact strength (kg · cm/cm²) |
|---|---|---|---|
| | First stage (parts) | Second stage (parts) | |
| Example 4-(a) | St (25) | ← MMA (25) | 99.7 |
| Example 4-(b) | St (25) | ← MMA (50) | 101.6 |
| Example 4-(c) | St (50) | ← MMA (15) | 83.2 |
| Comp. Ex. 7 | MMA (60) | | 25.3 |
| Comp. Ex. 8 | St (60) | | 11.7 |
| Comp. Ex. 9 | St (5) | ← MMA (55) | 28.5 |
| Comp. Ex. 10 | MMA (25) | ← St (25) | 24.9 |
| Comp. Ex. 11 | St (50) | ← MA (15) | 18.3 |

St: styrene, MMA: methyl methacrylate

From the above Table 4, it will be understood that a significant effect on imparting the impact resistance is obtained when the component (c) is polymerized such that the monomer mainly composed of the aromatic vinyl compound is polymerized in the first stage and the monomer mainly composed of the methacrylic ester is subsequently polymerized in the second stage in specific ratios.

EXAMPLE 5

In the same manner as in Examples 1-(1) to (3), a polybutadiene latex having an average particle size of 0.5 μm was obtained. Subsequently, Example 1-(4) was repeated except that the ratio between the monomer mainly composed of an acrylic ester and a polyfunctional monomer was changed for the polymerization of the component (b), thereby obtaining graft copolymers. These copolymers were evaluated with respect to physical property in the same manner as in Example 1-(5). The results are shown Table 5

TABLE 5

| | Component (a) (parts) | Component (b) | | | Izod impact strength (kg · cm/cm²) |
|---|---|---|---|---|---|
| | | BA (parts) | TAC (parts) | TAC/BA (%) | |
| Example 5-(a) | 10 | 89.5 | 0.5 | 0.56 | 95.6 |
| Example 5-(b) | 10 | 89 | 1.0 | 1.12 | 88.7 |
| Comp. Ex. 12 | 10 | 90 | 0 | 0 | 11.0 |
| Comp. Ex. 13 | 10 | 89.97 | 0.03 | 0.03 | 15.8 |
| Comp. Ex. 14 | 10 | 85 | 5 | 5.88 | 9.5 |

BA: butyl acrylate, TAC: triallyl isocyanurate

As will become apparent from Table 5, the effect on imparting impact resistance lowers when the amount of the polyfunctional monomer is either less than 0.05% or larger than 5%.

The weather resistant impact modifier according to the invention has the effect of imparting good impact properties to various thermoplastic resins without a sacrifice of weather resistance.

What is claimed is:

1. A weather resistant impact modifier for thermoplastic resins which comprises a graft copolymer having a multi-layered structure which is obtained by graft polymerization of
   a component (c) which is a combination of
      (i) 10–100 parts by weight of a monomer or a monomer mixture consisting of an aromatic vinyl monomer in a first stage selected from the group consisting of styrene, alpha-methylstyrene and vinyl toluene and
      (ii) 10–100 parts by weight of a monomer or a monomer mixture consisting of a methacrylic ester in a second stage selected from the group consisting of alkyl esters of methacrylic acid,
   to 100 parts by weight of an elastomer obtained by polymerizing a component (b) consisting of 98–60 parts by weight of a monomer mixture composed of
      (i) 60–99.95 wt % of a copolymerizable monomer selected from the group consisting of alkyl esters of acrylic acid,
      (ii) 0–49.95 wt % of another copolymerizable monomer consisting of a vinyl group containing unsaturated monomer and
      (iii) 0.05–5 wt % of a polyfunctional monomer,
   in the presence of 2–40 parts by weight of a component (a) composed of a butadiene elastomer having a degree of swelling of 5–40 and an average particle size not less than 0.15 μm.
2. The modifier of claim 1 wherein the butadiene elastomer used as the component (a) is polybutadiene.
3. The modifier of claim 1 wherein the butadiene elastomer is prepared through agglomeration of the average particle size from a smaller size to a larger size.
4. The modifier of claim 3 wherein the agglomeration is carried out by using an electrolyte.
5. The modifier of claim 3 wherein the agglomeration is carried out by using an acid.
6. The modifier of claim 3 wherein the agglomeration is carried out by using a polymer latex containing carboxyl groups.
7. The modifier of claim 1 wherein the polymer used as the component (b) has a molecular weight of not less than 500,000 when polymerized without use of the polyfunctional crosslinking agent.
8. The modifier of claim 1 wherein the acrylic ester used as one of the component (b) is butyl acrylate.
9. The modifier of Claim 1 wherein the aromatic vinyl compound used as one of the component (c) is styrene.
10. The modifier of claim 1 wherein the methacrylic ester used as one of the component is methyl methacrylate.

* * * * *